(12) United States Patent
Matta et al.

(10) Patent No.: US 12,337,839 B2
(45) Date of Patent: Jun. 24, 2025

(54) DRIVER-ASSISTANCE SYSTEM FOR GENERATING A LOCAL LANE DATA FOR CONTROLLING A VEHICLE TO KEEP THE VEHICLE IN THE LANE AND FOR GENERATING GLOBAL LANE DATA BY A GNSS RECEIVER FOR REUSING INFORMATION PROVIDED BY THE LOCAL LANE DATA

(71) Applicant: FEV Group GmbH, Aachen (DE)

(72) Inventors: Sherif Matta, Auburn Hills, MI (US); Qusay Alrousan, Auburn Hills, MI (US)

(73) Assignee: FEV Group GmbH, Aachen (DE)

( * ) Notice: Subject to any disclaimer, the term of this patent is extended or adjusted under 35 U.S.C. 154(b) by 146 days.

(21) Appl. No.: 18/224,765

(22) Filed: Jul. 21, 2023

(65) Prior Publication Data
US 2025/0026341 A1 Jan. 23, 2025

(51) Int. Cl.
*B60W 30/12* (2020.01)
*B60W 50/00* (2006.01)
*G06V 20/56* (2022.01)

(52) U.S. Cl.
CPC ........ *B60W 30/12* (2013.01); *B60W 50/0097* (2013.01); *G06V 20/588* (2022.01); *B60W 2050/0056* (2013.01); *B60W 2420/403* (2013.01); *B60W 2552/53* (2020.02); *B60W 2556/50* (2020.02)

(58) Field of Classification Search
CPC ............ B60W 30/12; B60W 50/0097; B60W 2050/0056; B60W 2420/403; B60W 2552/53; B60W 2556/50; G06V 20/588
USPC ...................................... 701/41–44
See application file for complete search history.

(56) References Cited

U.S. PATENT DOCUMENTS

2020/0042013 A1 2/2020 Kelkar et al.
2023/0009269 A1* 1/2023 Prasad .................. B60W 30/12

FOREIGN PATENT DOCUMENTS

WO WO 2023129648 * 7/2023 ........... G05D 1/0297

* cited by examiner

*Primary Examiner* — Hai H Huynh
(74) *Attorney, Agent, or Firm* — Dinsmore & Shohl LLP

(57) ABSTRACT

The present disclosure relates to a driver-assistance system comprising a GNSS receiver, a camera and a control unit, wherein the driver-assistance system is configured to calculate respective local lane data for keeping the vehicle in the lane dependent on a respective image of at least the respective segment generated by means of the camera, wherein the respective local lane data specifies a respective course of the lane on the respective segment relative to the vehicle, wherein the driver-assistance system is configured to convert the respective local lane data into respective global lane data dependent on respective GNSS data of the vehicle generated by means of the GNSS receiver when driving on the respective segment and to save the respective global lane data, wherein the respective global lane data specifies the respective course of the lane on the respective segment in global coordinates.

10 Claims, 9 Drawing Sheets

DRIVER-ASSISTANCE SYSTEM FOR GENERATING A LOCAL LANE DATA FOR CONTROLLING A VEHICLE TO KEEP THE VEHICLE IN THE LANE AND FOR GENERATING GLOBAL LANE DATA BY A GNSS RECEIVER FOR REUSING INFORMATION PROVIDED BY THE LOCAL LANE DATA

FIELD OF THE INVENTION

The present disclosure relates in general to the field of automated and semi-automated control of a vehicle and, in particular, to a driver-assistance system for keeping a vehicle in a lane and a method for assisting a driver of a vehicle in keeping a vehicle in a lane.

BACKGROUND

Driver-assistance systems for keeping a vehicle in a lane usually make use of markings of a side-line of the lane. For example, a camera may produce images of markings of a left side-line and a right side-line of the lane and send the images to a control unit. The control unit may be equipped to control a distance of the vehicle to the left side-line and the right side-line dependent on information given by the images of the markings.

SUMMARY

Various embodiments provide a driver-assistance system for keeping a vehicle in a lane of a road and a method for keeping a vehicle in a lane of a road described by the subject matter of the independent claims. Advantageous embodiments are described in the dependent claims. Embodiments of the present disclosure can be freely combined with each other if they are not mutually exclusive.

In one aspect, the present disclosure relates to a driver-assistance system for keeping a vehicle in a lane of a road when driving along segments of the road. The driver-assistance system includes a GNSS (Global Navigation Satellite System) receiver, a camera and a control unit. The driver-assistance system is configured to calculate respective local lane data dependent on a respective image of at least the respective segment. The respective image is generated by the camera. The respective local lane data specifies a respective course of the lane on the respective segment relative to the vehicle. The control unit is configured to steer the vehicle dependent on the respective local lane data such that the vehicle stays in the lane when driving on the respective segment. Furthermore, the driver-assistance system is configured to convert the respective local lane data into respective global lane data dependent on respective GNSS position and heading data of the vehicle, in the following referred to as respective GNSS data. The respective GNSS data of the vehicle is generated by the GNSS receiver when driving on the respective segment. The respective global lane data specifies the respective course of the lane on the respective segment in global coordinates. Furthermore, the driver-assistance system is configured to save the respective global lane data.

The advantage of converting the local lane data into the global lane data and saving the global lane data is that the global lane data may be reused for steering the vehicle to keep it in the lane when driving on the road a repeated time. A reuse of the global lane data may involve a recovering of information provided by the local lane data, such as information about the respective course of the lane on the respective segment. The reuse of the global lane data and the recovering of the information of the respective local lane data may allow to control the vehicle in an automated manner even in situations in which the camera may not be able to generate sharp images of the segments of the road when driving on the road the repeated time. This may enhance the desirability of the driver-assistance system in bad weather conditions or in dense traffic in case the road is driven for the repeated time.

In addition, the recovered information of the respective local lane data may serve as a redundant information about the respective course of the lane on the respective segment of the road when driving on the road the repeated time. This may save computational time and resources on the one hand. In one example, the redundant information may be used to predict the respective course of the lane on further subsequent segments of the road in the direction of travel. On the other hand, the redundant information may be used to fuse this information with updated information provided by, for example, new images of the respective segment of the road generated by the camera when driving along the respective segment for a respective repeated time. Such a sensor fusion may further enhance the desirability of the driver-assistance system. Generally, the vehicle may drive along the respective segment for the respective repeated time when driving on the road the repeated time.

According to one embodiment, the driver-assistance system may be configured to calculate respective further local lane data on the basis of the respective global lane data and respective further GNSS position and heading data of the vehicle, in the following referred to as respective further GNSS data. The respective further GNSS data may be generated by the GNSS receiver when driving on the respective segment for the respective repeated time. According to this embodiment, the driver-assistance system may be configured to steer the vehicle dependent on the respective further local lane data such that the vehicle stays in the lane when driving on the respective segment the respective repeated time. The respective further local lane data may specify the respective course of the lane on the respective segment relative to the vehicle. In most applications, the vehicle may be located in a different position on the respective segment when driving on the respective segment for the respective repeated time. The respective further local lane data may be considered as a recovered information of the respective local lane data which was generated by the control unit based on the respective image of at least the respective segment.

The recovered information of the respective local lane data may include information about the respective course of the lane on the respective segment relative to the vehicle. It is understood that the respective further GNSS data is used to recalculate the respective course of the lane on the respective segment relative to the vehicle because the vehicle may be located in the different position on the respective segment when driving on the respective segment for the respective repeated time. In other words, the respective further GNSS data may differ from the respective GNSS data in most cases when driving on the road with the vehicle for the respected repeated time. As a consequence, the respective further local lane data may differ from the respective local lane data. However, the proposed driver-assistance system may allow to take into account a difference between the respective GNSS data and the respective further GNSS data for determining the respective further local lane data on the basis of the respective global lane data.

A further advantage of saving the respective global lane data is that the global lane data may be used not only for controlling the vehicle but for controlling one or more further, or additional, vehicles, which drive along the road after the global lane data was generated. For that purpose, the respective global lane data may be stored on an external server. The proposed driver-assistance system may include a transmitter to send the respective global lane data to the external server.

In another aspect, the present disclosure relates to a method for keeping a vehicle in a lane of a road when driving along segments of the road by a driver-assistance system. The driver-assistance system may be similar to the driver-assistance system described above or below and may include a GNSS receiver, a camera and a control unit. The method includes the following steps. In a first step, a respective image of at least the respective segment may be generated by the camera. In a second step, respective local lane data may be calculated dependent on the respective image, wherein the respective local lane data specifies a respective course of the lane on the respective segment relative to the vehicle. In a third step, the vehicle may be steered dependent on the respective local lane data by the control unit such that the vehicle stays in the lane when driving on the respective segment. In a fourth step, the respective local lane data may be converted into respective global lane data dependent on respective GPS data of the vehicle generated by the GPS sensor when driving on the respective segment. In a fifth step, the respective global lane data may be saved, wherein the respective global lane data specifies the respective course of the lane on the respective segment in global coordinates.

The method may include the following further steps. In a first further step, respective further local lane data may be calculated on the basis of the respective global lane data and dependent on respective further GPS data of the vehicle generated by the GPS sensor when driving on the respective segment for a respective repeated time. The respective further local lane data specifies the respective course of the lane on the respective segment relative to the vehicle. In a second further step, the vehicle may be steered dependent on the respective further local lane data such that the vehicle stays in the lane when driving on the respective segment the respective repeated time.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
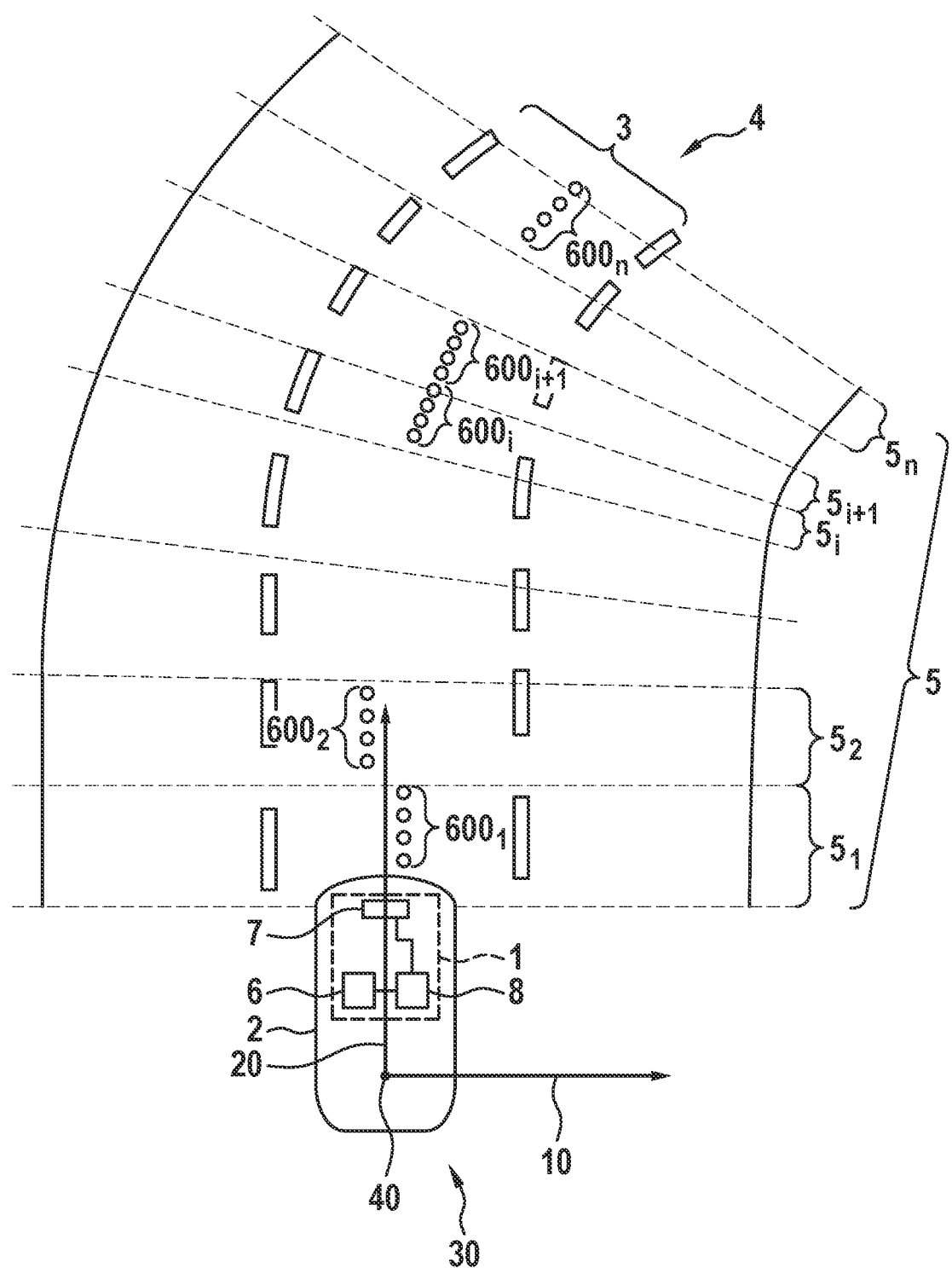
FIG. 1 depicts a vehicle including a driver-assistance system with a camera, a GNSS receiver and a control unit.

FIG. 1 depicts a driver-assistance system 1 for keeping a vehicle 2 in a lane 3 of a road 4 when driving along segments 5 of the road 4. A number of the segments 5 may be equal to n. FIG. 1 shows a first segment $5_1$, a second segment $5_2$ and an n-th segment $5_n$. In the following, a respective segment of the segments 5 may be referred to as respective segment $5_i$. The driver-assistance system 1 may include a GNSS receiver 6, a camera 7 and a control unit 8.

The control unit 8 of the driver-assistance system 1 may be an electronic control unit (ECU), a central processing unit (CPU), and/or the like, for performing the functions as described herein. For example, the ECU may be configured to receive, analyze and process sensor data, perform calculations and mathematical functions, convert data, generate data, control steering system components, and the like. The ECU may include one or more processors, and other components, for example one or more memory modules that stores logic that is executable by the one or more processors. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors. The computer-executable instructions may include logic or algorithms, written in any programming language of any generation such as, for example machine language that may be directly executed by the processors, or assembly language, object orientated programming, scripting languages, microcode, etc., that may be compiled or assembled into computer-executable instructions and storage on the one or more memory modules. Alternatively, the computer-executable instructions may be written in our hardware description language, such as logic implemented via either a field programmable gate array (FPGA) configuration or an application specific integrated circuit (ASIC), all their equivalents. Accordingly, the methods and/or processes described herein may be implemented in any conventional computer programming language, as preprogrammed hardware elements, or as a combination of hardware and software components.

Figure 4:
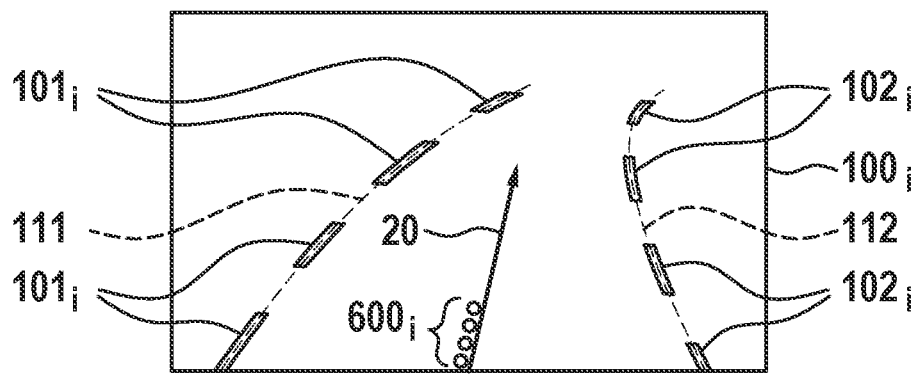
FIG. 4 represents a respective image recorded by the camera shown in FIG. 1 during a respective time interval when the vehicle drives on a respective segment of the road shown in FIG. 1.
Figure 5:
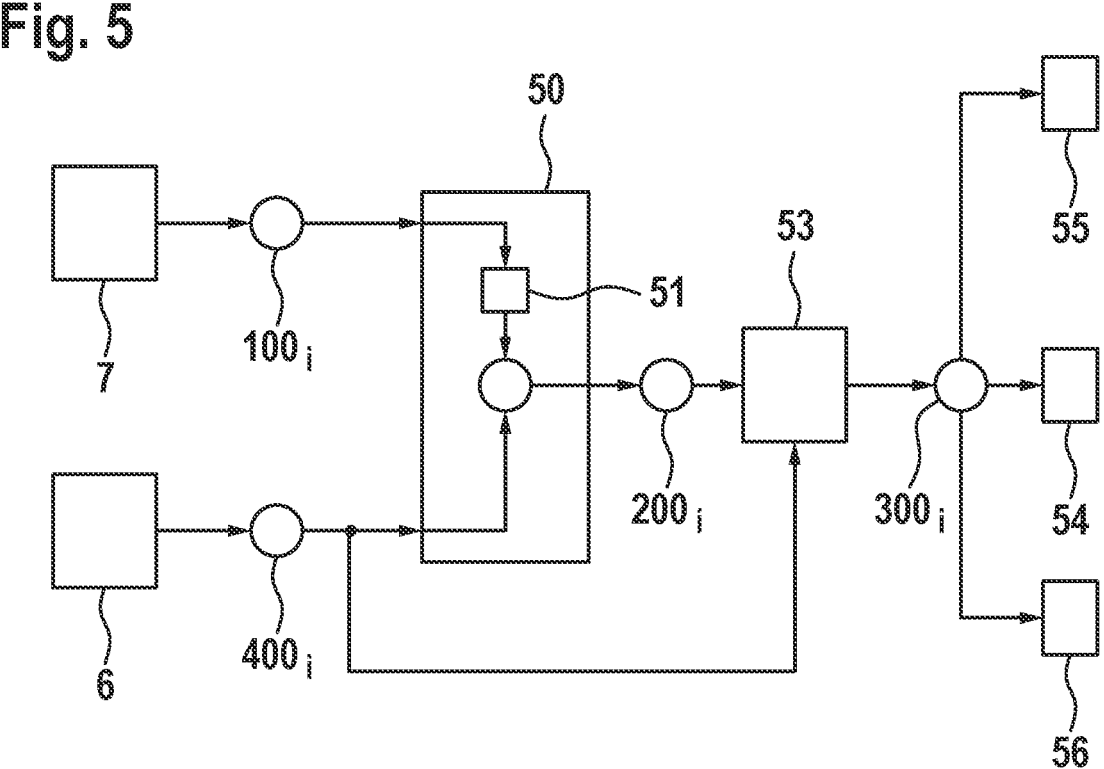
FIG. 5 is a block diagram illustrating a generation of respective local lane data and respective global lane data on the basis of the respective image shown in FIG. 4 and respective GNSS data generated by the GNSS receiver shown in FIG. 1.

The driver-assistance system 1 may be configured to calculate respective local lane data $200_i$, as shown in FIG. 5, dependent on a respective image $100_i$ of at least the respective segment $5_i$ generated by the camera 7. The respective image $100_i$, as shown in FIG. 4, may be generated within a respective time interval in which the respective segment $5_i$ may be positioned below of at least a part of the camera 7 or ahead of the camera 7, as seen in the direction of travel of the vehicle 2. For example, the camera 7 may produce a first image $100_1$, demonstrated in FIG. 2, within a first time interval in which a part of the camera 7 is arranged above the first segment $5_1$, as illustrated in FIG. 1. Similarly, the camera 7 may produce a second image $100_2$, demonstrated in FIG. 3, within a second time interval in which a part of the camera 7 is arranged above the second segment $5_2$. In most applications, the respective image $100_i$ may illustrate not only the respective segment $5_i$ but also several respective subsequent segments, for example respective three subsequent segments of the segments 5, which follow the respective segment $5_i$ in the direction of travel.

The respective local lane data $200_i$ may specify a respective course of the lane 3 on the respective segment $5_i$, particularly on the respective segment $5_i$ and the several respective subsequent segments following the respective segment $5_i$ in the direction of travel, relative to the vehicle 2.

For example, first local lane data may describe a first course of the lane 3 on the first segment $5_1$ and first subsequent segments. The first local lane data may include coefficients of a first mathematical function for describing a first course of a left sideline 111 of the lane 3 on the first segment $5_1$ and the first subsequent segments, in the following also referred to as first left sideline function, in a local coordinate system 30 of the vehicle 2. The local coordinate system 30 is illustrated in FIG. 1 and may include an x-axis 10 and a y-axis 20. The y-axis 20 may run in the direction of travel of the vehicle 2 and the x-axis 10 may be orientated perpendicular to the direction of travel.

Figure 2:
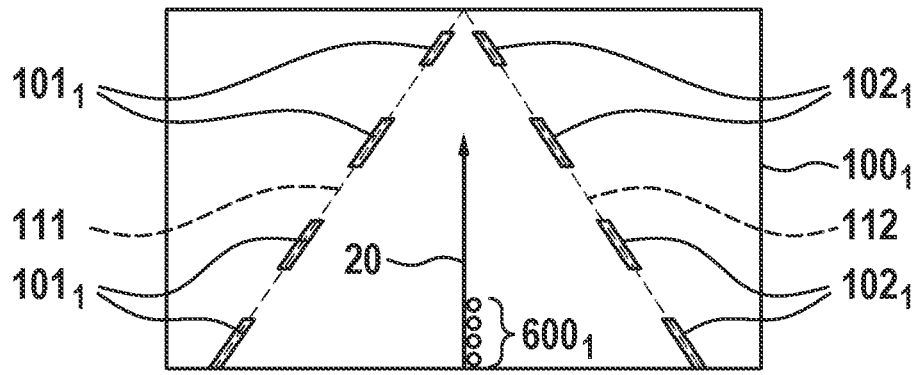
FIG. 2 shows a first image recorded by the camera shown in FIG. 1 during a first time interval when the vehicle drives on a first segment of a road shown in FIG. 1.

The first left sideline function may approximate a course of a first set of left markings $101_1$ of the lane 3, as shown in FIG. 2. The first set of left markings $101_1$ may indicate the left sideline 111 on the first segment $5_1$ and the first subsequent segments which may be illustrated by the first image $100_1$. Similarly, a first right sideline function may approximate a course of a first set of right markings $102_1$ of the lane 3, as shown in FIG. 2. The first set of right markings $102_1$ may indicate a right sideline 112 of the lane 3 on the first segment $5_1$ and on the first subsequent segments.

Figure 3:
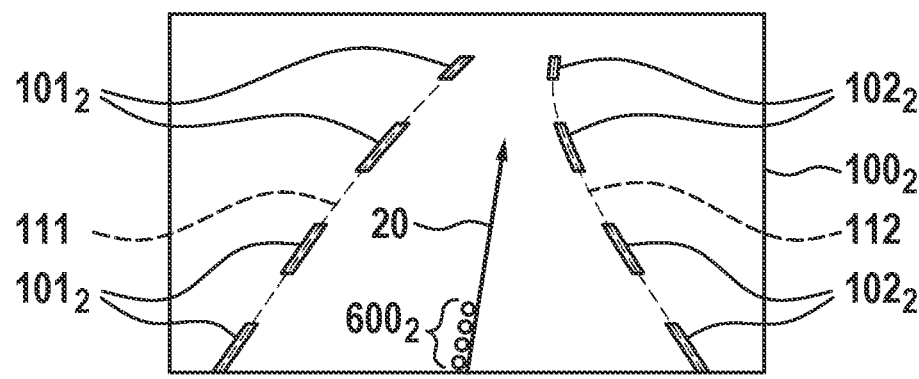
FIG. 3 shows a second image recorded by the camera shown in FIG. 1 during a second time interval when the vehicle drives on a second segment of the road shown in FIG. 1.

Analogously, a second left sideline function may approximate a course of a second set of left markings $101_2$ of the lane 3, as shown in FIG. 3. The second set of left markings $101_2$ may indicate the left sideline 111 on the second segment $5_2$ and second subsequent segments which may be illustrated by the second image $100_2$. Similarly, a second right sideline function may approximate a course of a second set of right markings $102_2$ of the lane 3, as shown in FIG. 3. The second set of right markings $102_2$ may indicate the right sideline 112 of the lane 3 on the second segment $5_2$ and the second subsequent segments.

Considering the respective local lane data $200_i$, the respective local lane data $200_i$ may describe the respective course of the lane 3 on the respective segment $5_i$, and particularly on the respective subsequent segments. Referring to FIG. 4, the respective local lane data $200_i$ may include coefficients of a respective mathematical function for describing a respective course of the left sideline 111 of the lane 3 on the respective segment $5_i$ and the respective subsequent segments, in the following also referred to as respective left sideline function, within the local coordinate system 30. The respective left sideline function may approximate a course of a respective set of left markings $101_i$ of the lane 3, as shown in FIG. 4. The respective set of left markings $101_i$ may indicate the left sideline 111 on the respective segment $5_i$ and the respective subsequent segments. The coefficients of the respective left sideline function may be referred to as respective left sideline coefficients $210_i$ in the following.

Analogously, and still referring to FIG. 4, the respective local lane data $200_i$ may include coefficients of a respective mathematical function for describing a respective course of the right sideline 112 of the lane 3 on the respective segment $5_i$ and respective subsequent segments, in the following also referred to as respective right sideline function. The respective right sideline function may approximate a course of a respective set of right markings $102_i$ of the lane 3, as shown in FIG. 4. The respective set of right markings $102_i$ may indicate the right sideline 112 on the respective segment $5_i$ and the respective subsequent segments. The coefficients of the respective right sideline function may be referred to as respective right sideline coefficients $220_i$ in the following.

The control unit 8 may generate the respective left sideline coefficients $210_i$ and the respective right sideline coefficients $220_i$ dependent on respective pixel data of the respective image $100_i$ using a pattern recognition module in one example.

In one example, the respective left sideline function and the respective right sideline function may be each configured in the form of a respective 4-degree polynomial. In this case, the respective 4-degree polynomial may be defined by a respective set of four coefficients. In the following, a meaning of the respective four coefficients of either the respective left sideline function or the respective right sideline function, in the following together also referred to as respective sideline function, is explained.

A first coefficient of the respective set of coefficients may indicate a respective distance between the respective sideline function and the vehicle 2, in particular a respective distance between the respective sideline function and an origin 40 of the local coordinate system 30 of the vehicle 2. The distance between the respective sideline function and the origin 40 may be measured with respect to the x-axis 10.

A second coefficient of the respective set of coefficients may indicate a respective heading of the respective sideline function within the coordinate system 30. A third coefficient of the respective set of coefficients may indicate a curvature of the respective sideline function and a fourth coefficient of the respective set of coefficients may indicate a change in the curvature of the respective sideline function, particularly with respect to a path coordinate running along the respective sideline function.

The first, second, third and fourth coefficient of the respective set of coefficients may be generated by a local lane data generation module 50 which is also referred to as local data module 50 in the following and is shown in FIG. 5. The local data module 50 may be an electronic control unit (ECU), a central processing unit (CPU), and/or the like, for performing the functions as described herein. For example, the ECU may be configured to receive, analyze and process sensor data and/or image data, perform calculations and mathematical functions, convert data, fuse data, or information, detect sidelines, analyze pixels of image data, and the like. The ECU may include one or more processors, and other components, for example one or more memory modules that stores logic that is executable by the one or more processors. Each of the one or more processors may be a controller, an integrated circuit, a microchip, central processing unit or any other computing device. The one or more memory modules may be non-transitory computer readable medium and may be configured a RAM, ROM, flash memories, hard drives, and, or any device capable of storing computer-executable instructions, such that the computer-executable instructions can be accessed by the one or more processors.

The local data module 50 may generate the respective local lane data $200_i$ dependent on the respective image $100_i$. The local data module 50 may include a sideline detection module 51 for detecting a respective position of the left sideline 111 and a respective position of the right sideline 112 relative to the vehicle 2 dependent on the respective pixel data of the respective image $100_i$. The local data module 50 may be integrated in the control unit 8 in one example.

The GNSS receiver may receive respective GNSS signals within the respective time interval. This may imply that the GNSS receiver produces respective GNSS data $400_i$ within the respective time interval, and may be dependent on the respective GNSS signals. Thus, the respective local lane data $200_i$ may be associated with the respective GNSS data $400_i$ of the vehicle 2. In one example, the local data module 50 may fuse information generated by the sideline detection module 51 dependent on the respective pixel data of the respective image $100_i$ with information given by the respective GNSS data $400_i$ in order to create the respective local lane data $200_i$. The respective GNSS data $400_i$ of the vehicle 2 may be generated by the GNSS receiver 6 when driving at least partially on the respective segment $5_i$. For example, the GNSS receiver 6 may generate first GNSS data of the vehicle 2 in the first time interval in which the vehicle 2 drives at least partially on the first segment $5_1$, as shown in FIG. 1.

In some embodiments, the control unit 8 may produce the respective local lane data $200_i$ dependent on the respective GNSS data $400_i$. For example, an orientation of the y-axis 20 of the local coordinate system 30 may be determined dependent on a respective heading of the vehicle 2 during the respective time interval. The respective GNSS data $400_i$ may include the respective heading of the vehicle 2 and a respective global position of the vehicle 2 during the respective time interval. Since the heading of the vehicle 2 may change with every respective time interval and the course of the lane 3 with respect to the vehicle 2 may change with every respective time interval, the respective local lane data $200_i$ may differ with every time interval. A change of the heading of the vehicle 2 may be indicated by a change of the orientation of the y-axis 20 as demonstrated when comparing FIG. 2. FIG. 3 and FIG. 4.

The control unit 8 may be configured to steer the vehicle 2 dependent on the respective local lane data $200_i$ such that the vehicle 2 stays in the lane 3 when driving on the respective segment $5_i$. Staying in the lane 3 implies staying between the left sideline 111 and the right sideline 112 when driving along the segments 5, during the respective time interval. The control unit 8 may include a lateral controller 60 for controlling a respective left distance between the vehicle 2, such as between the origin 40 of the local coordinate system 30, and the left sideline 111 when driving on the respective segment $5_i$. Alternatively, or in addition, the lateral controller 60 may be configured to control a respective right distance between the vehicle 2, such as between the origin 40 of the local coordinate system 30, and the respective right sideline $112_i$ when driving on the respective segment $5_i$.

Figure 6:
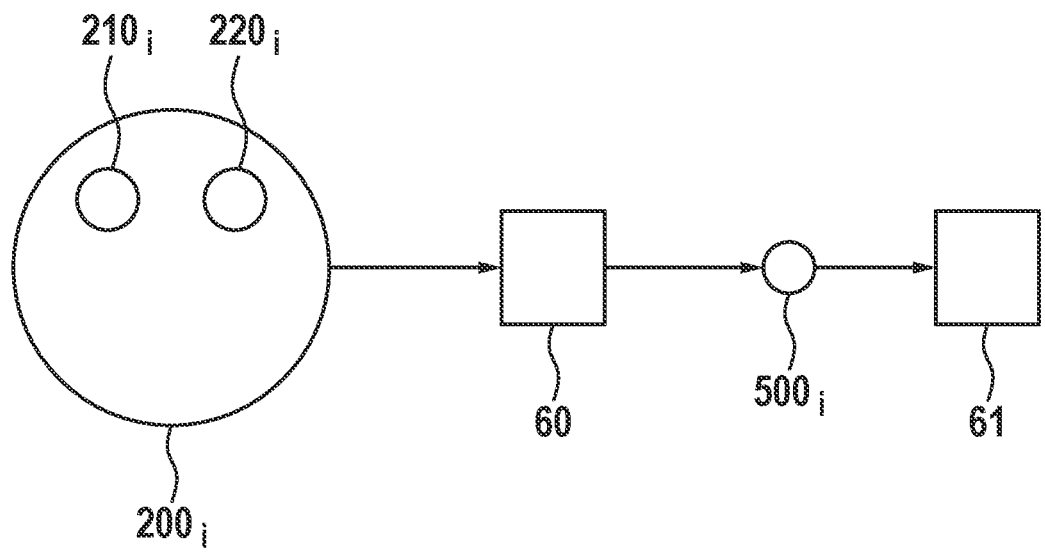
FIG. 6 is a block diagram demonstrating a controlling of a steering system of the vehicle shown in FIG. 1 dependent on the respective local lane data shown in FIG. 5.

In one example, the lateral controller 60 may control a steering system 61 of the vehicle 2 dependent on the respective local lane data $200_i$, as indicated in FIG. 6. The lateral controller 60 may control the steering system 61 such that the respective left distance may be equal to the respective right distance so that the vehicle 2 drives in the middle of the lane 3. In order to realize this, the lateral controller 60 may send respective steering commands $500_i$ to the steering system 61 within the respective time interval. The lateral controller 60 may calculate the respective steering commands $500_i$ on the basis of the respective local lane data $200_i$, particularly on the basis of the respective left sideline coefficients $210_i$ and the respective right sideline coefficients $220_i$. The respective local lane data $200_i$ may include the respective left sideline coefficients $210_i$ and the respective right sideline coefficients $220_i$, as shown in FIG. 6.

Furthermore, the driver-assistance system 1 may be configured to convert the respective local lane data $200_i$ into respective global lane data $300_i$ dependent on the respective GNSS data $400_i$ of the vehicle 2. The control unit 8 may execute a conversion module 53 in order to calculate the respective global lane data $300_i$ dependent on the respective GNSS data $400_i$ and dependent on the respective left sideline function and the respective right sideline function, particularly dependent on the respective local lane data $200_i$. The respective global lane data $300_i$ may specify the respective course of the lane 3 on the respective segment $5_i$ and the respective subsequent segments in global coordinates. As such, the a conversion module 53 may include one or more processors, memory devices with logic modules that contain stored logic that is executed by the one or more processors, data storage devices, and the like, to perform the operations disclosed herein.

In one example, the respective global lane data $300_i$ may include data for specifying a respective set of GNSS points $600_i$. In this example, the respective global lane data $300_i$ may include a latitude value and a longitude value of each GNSS point of the respective set of GNSS points $600_i$. FIG. 1 depicts a first set of GNSS points $600_1$ indicating the first course of the lane 3 on the first segment $5_1$. First global lane data, not shown in the Figures, may include a respective latitude value and a respective longitude value of the respective GNSS point of the first set of GNSS points $600_1$. Similarly, second global lane data, not shown in the Figures, may include a respective latitude value and a respective longitude value of the respective GNSS point of a second set of GNSS points $600_2$. The second set of GNSS points $600_2$ may indicate a second course of the lane 3 on the second segment $5_2$ in global coordinates. In general, the respective set of GNSS points $600_i$ may indicate the respective course of the lane 3 on the respective segment $5_i$ in global coordinates. For sake of completeness, an n-th set of GNSS points $600_n$ is depicted in FIG. 1 for indicating an n-th course of the lane 3 on the n-th segment $5_n$ in global coordinates.

According to the example shown in FIG. 4, the respective global lane data $300_i$ may include data for specifying the respective set of GNSS points $600_i$ as respective middle points of the lane on the respective segment $5_i$. However, according to another example, the respective global lane data $300_i$ may include data for specifying a respective set of left GNSS points which are located on the left sideline 111 and on the respective segment $5_i$. Analogously, the respective global lane data $300_i$ may include data for specifying a respective set of right GNSS points which are located on the right sideline 112 and on the respective segment $5_i$.

A number of GNSS points of the respective set of GNSS points $600_i$ may be equal or greater than four. This may have the advantage that not only a respective global position, but a respective global heading, a respective global curvature and a respective change of the global curvature of the respective course of the lane 3 on the respective segment $5_i$ may be captured by the respective set of GNSS points $600_i$. For example, if only respective three GNSS points were provided by the respective set of GNSS points $600_i$, then the change of the global curvature of the respective course of the lane 3 on the respective segment $5_i$ may not be retrievable by the respective three GNSS points.

Furthermore, the driver-assistance system 1 may be configured to save the respective global lane data $300_i$. In one example, the control unit 8 may save the respective global lane data $300_i$ in a memory device 54 of the control unit 8. Alternatively, or in addition, a transmitter of the driver-assistance system 1, not shown in the Figures, may send the respective global lane data $300_i$ to an external server 55, particularly using the 5G radio standard. Alternatively, or in addition, the transmitter of the driver-assistance system 1 may send the respective global lane data $300_i$ to a further vehicle 56. This may be realized using the 5G radio standard or a dedicated short range communication standard (DSRC). The further vehicle 56 may drive behind the vehicle 2 in one example. In this case, a control system of the further vehicle may process and use the respective global lane data $300_i$ in a similar manner as the control unit 8 in case the vehicle 2 drives along the road 4 a repeated time, which is described below. Particularly, the control system of the further vehicle 56 may steer the further vehicle 56 dependent on the respective global lane data $300_i$ and respective further GNSS data of the further vehicle 56 generated by a GNSS receiver of the further vehicle 56 when driving on the respective segment $5_i$ such that the further vehicle 56 stays in the lane 3 when driving on the respective segment $5_i$.

Figure 7:
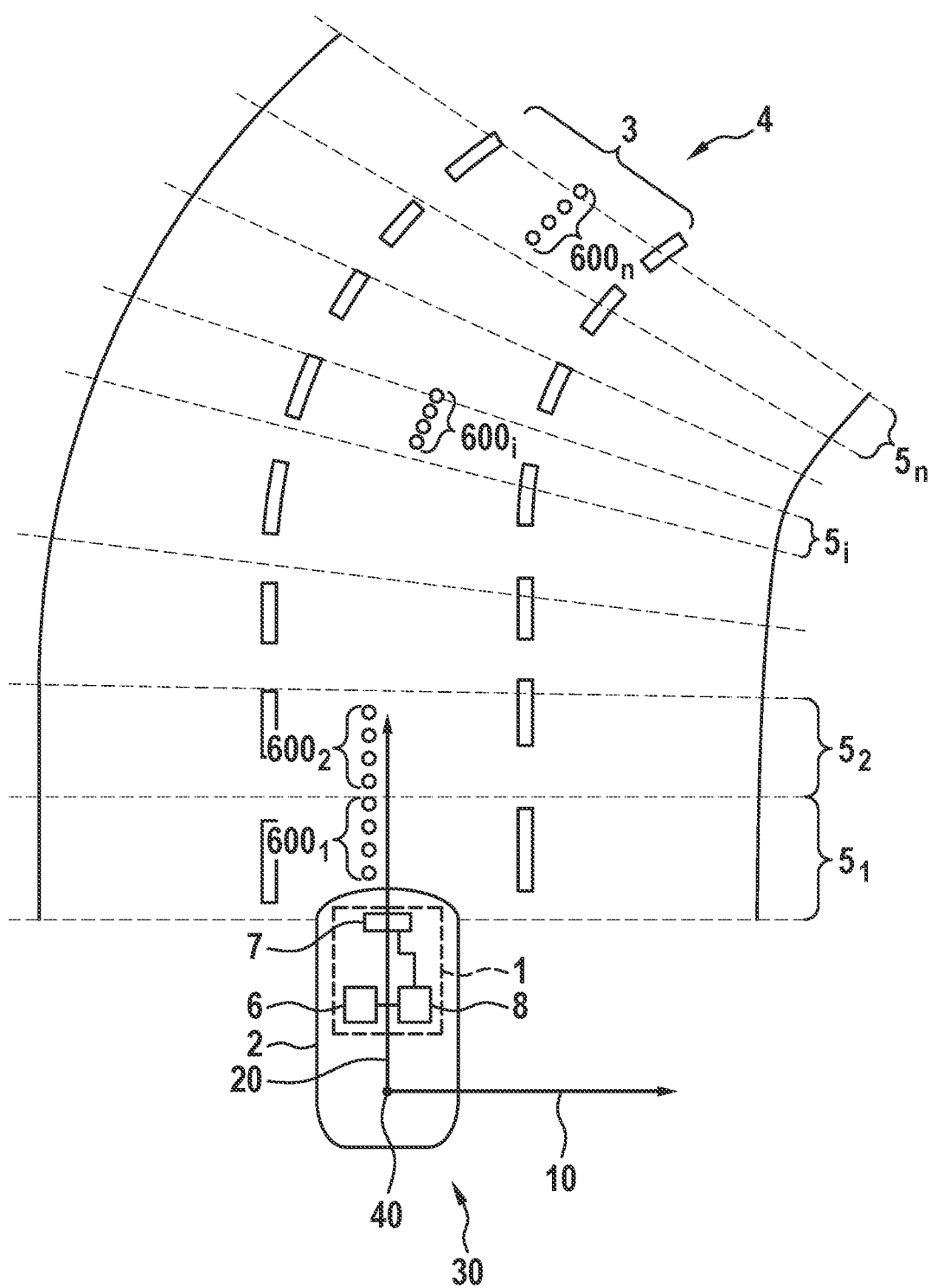
FIG. 7 depicts an application in which the vehicle shown in FIG. 1 drives along the road shown in FIG. 1 a repeated time.

FIG. 7 shows an application in which the vehicle 2 drives along the road 4 the repeated time. In the following it is assumed that the vehicle 2 drives along the road 4 during difficult weather conditions which do not allow to take sharp images of the segments 5 of the road 4 by the camera 7. This may prevent to produce data such as the respective local lane data $200_i$ with a satisfying or desirable accuracy. The following describes how the driver-assistance system 1 may use the respective global lane data $300_i$ in order to recover information provided by the respective local lane data $200_i$ when driving along the respective segment $5_i$ for a respective repeated time.

Figure 8:
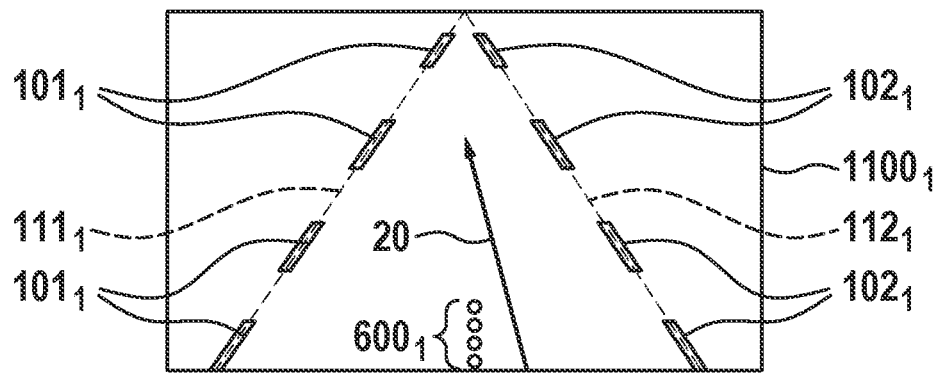
FIG. 8 shows a first further image produced by the camera shown in FIG. 1 during a first further time interval when the vehicle drives on the first segment of the road shown in FIG. 1 for a repeated time.
Figure 9:
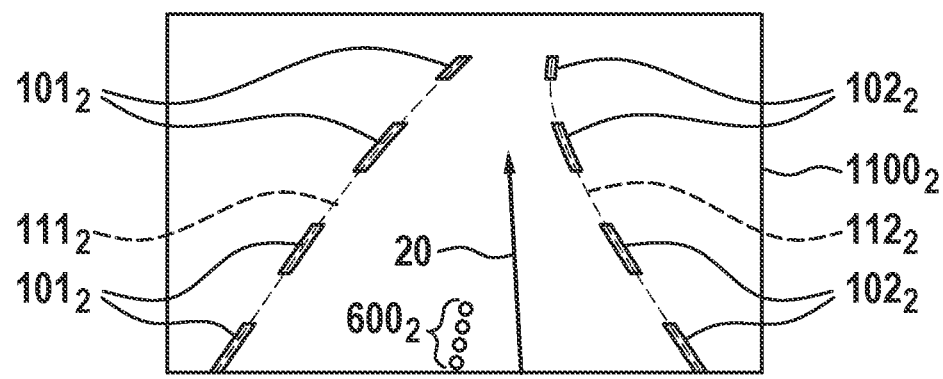
FIG. 9 shows a second further image produced by the camera shown in FIG. 1 during a second further time interval when the vehicle drives on the second segment of the road shown in FIG. 1 for a repeated time.
Figure 10:
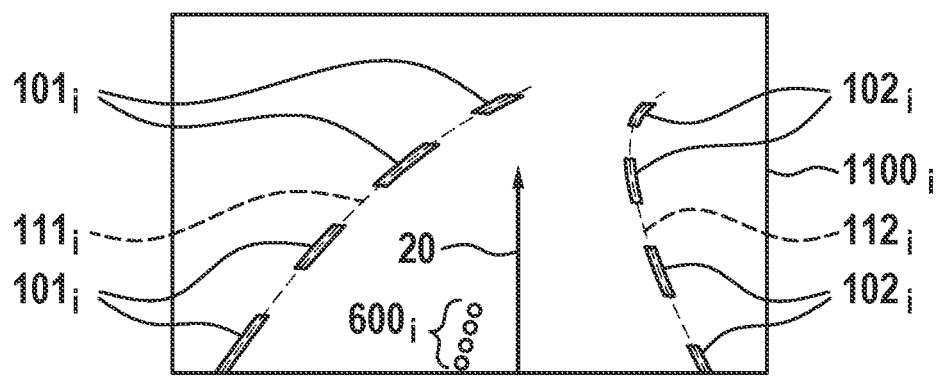
FIG. 10 represents a respective further image produced by the camera shown in FIG. 1 during a respective further time interval when the vehicle drives on the respective segment of the road shown in FIG. 1 for a respective repeated time.

The vehicle 2 may be located in a different position on the respective segment $5_i$ when driving along the respective segment $5_i$ for the respective repeated time. This can be seen in FIG. 10 which illustrates a view from the vehicle 2 on the road 4 when driving on the respective segment $5_i$ for the respective repeated time. Analogously. FIG. 8 and FIG. 9 both illustrate a view from the vehicle 2 on the road 4 when driving on the first segment $5_1$ and on the second segment $5_2$ for the repeated time. When comparing FIGS. 8 to 10 with FIGS. 2 to 4, it can be observed that the vehicle 2 is located differently on the road 4. According to FIGS. 2 to 4, the vehicle 2 is driving in the middle of the lane 3, whereas FIGS. 8 to 10 illustrate that the vehicle 2 drives a bit more on the right side of the lane 3. In addition, it can be observed that the heading of the vehicle 2 indicated by the y-axis 20 of the local coordinate system 30 is oriented differently. This may result from a prior lane change of the vehicle 2 according to a possible use case.

Figure 11:
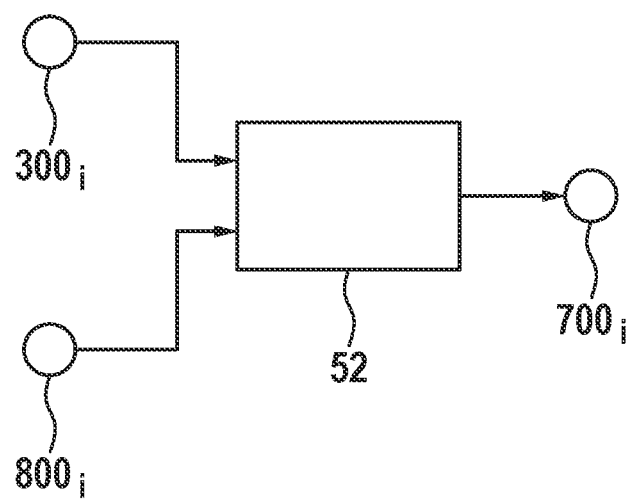
FIG. 11 is a block diagram illustrating a generation of respective further local lane data dependent on the respective global lane data shown in FIG. 5 and respective further GNSS data generated by the GNSS receiver when the vehicle drives on the respective segment of the road shown in FIG. 7 for the respective repeated time.

In one example, the driver-assistance system 1 may be configured to calculate respective further local lane data $700_i$ on the basis of the respective global lane data $300_i$ and on the basis of respective further GNSS data $800_i$ of the vehicle 2. In one example, a recovering module 52 of the control unit 8 may calculate the respective further local lane data $700_i$ dependent on the respective global lane data $300_i$ and the respective further GNSS data $800_i$, as shown in FIG. 11. The respective further local lane data $700_i$ may describe the respective course of the lane 3 on the respective segment $5_i$, and particularly on the respective subsequent segments, with respect to the vehicle 2 in the local coordinate system 30. As such, the recovering module 52 may include one or more processors, memory devices with logic modules that contain stored logic that is executed by the one or more processors, data storage devices, and the like, to perform the operations disclosed herein.

The GNSS receiver 6 may be configured to generate the respective further GNSS data $800_i$ when the vehicle 2 drives on the respective segment $5_i$ for the respective repeated time within a respective further time interval. In one example, the control unit 8 may load the respective global lane data $300_i$ from the memory device 54 into a cache of a processor of the control unit 8. In another example, a receiver of the driver-assistance system 1 may receive the respective global lane data $300_i$ which may be send from the external server 55.

According to one example, the control unit 8, particularly the recovering module 52, may generate a respective further mathematical function for describing the respective course of the left sideline 111 of the lane 3 on the respective segment $5_i$ and the respective subsequent segments, in the following also referred to as respective further left sideline function, within the local coordinate system 30. In order to generate the respective further left sideline function, the control unit 8 may approximate a course of the respective set of GNSS points $600_i$ which indicate the respective course of the lane 3 on the respective segment $5_i$ and the respective subsequent segments in global coordinates. The control unit 8 may then determine the respective further left sideline function based on the approximated course of the respective set of GNSS points $600_i$ and dependent on the respective further GNSS data $800_i$. In addition, the control unit 8 may take into account a width of the lane 3 in order to retrieve the respective further left sideline function dependent on the course of the respective set of GNSS points $600_i$.

Analogously to the respective further left sideline function, the control unit 8, and components thereof, such as the recovering module 52, may generate a respective further mathematical function for describing the respective course of the right sideline 112 of the lane 3 on the respective segment $5_i$ and the respective subsequent segments, in the following also referred to as respective further right sideline function, within the local coordinate system 30. It is understood that the origin 40 of the local coordinate system 30 is shifted to the right with respect to an origin of a global coordinate system when the vehicle 2 drives on the segments 5 for the repeated time compared to the scenarios illustrated in FIG. 2 to FIG. 4. As a result, the respective right sideline function may differ from the respective further right sideline function; and the respective left sideline function may differ from the respective further left sideline function.

The respective further left sideline function and the respective further right sideline function may be each configured in the form of a respective further polynomial and may be specified by respective further coefficients in one example. Those respective further coefficients that specify the respective further left sideline function may be referred to as respective further left sideline coefficients $710_i$ in the following. Those further coefficients that specify the respective further right sideline function may be referred to as respective further right sideline coefficients $720_i$ in the following.

Figure 12:
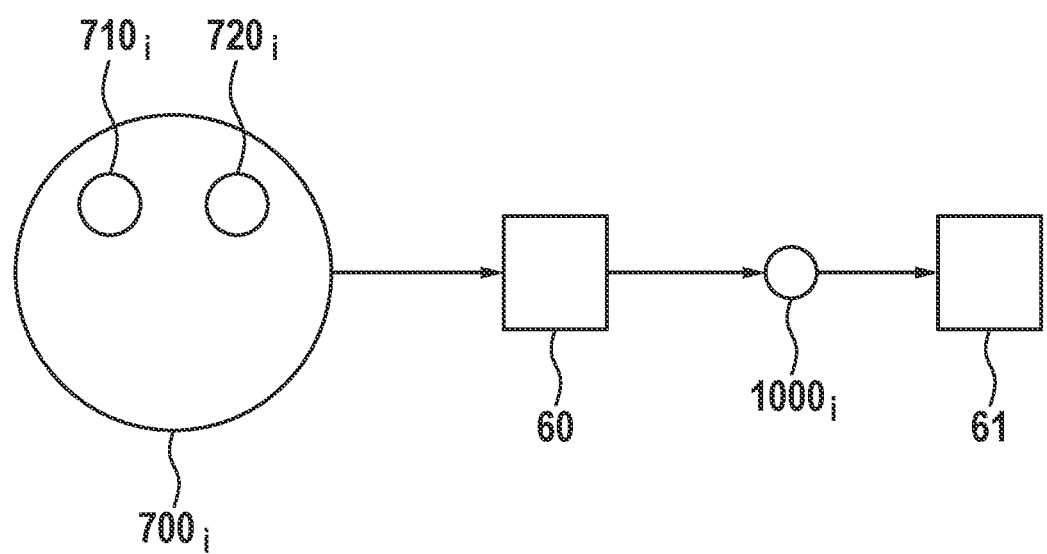
FIG. 12 is a block diagram demonstrating a controlling of the steering system of the vehicle shown in FIG. 1 dependent on the respective further local lane data shown in FIG. 11.

For Example, the respective further left sideline function and the respective further right sideline function may each be configured in the form of a respective further 4-degree polynomial. In this case, the respective further 4-degree polynomial may be defined by a respective further set of four coefficients. The control unit 8 may be configured to steer the vehicle 2 dependent on the respective further local lane data $700_i$ such that the vehicle 2 stays in the lane 3 when driving on the respective segment $5_i$ for the respected repeated time during the respective further time interval. To realize this, the lateral controller 60 may send respective further steering commands $1000_i$ to the steering system 61 within the respective further time interval. The lateral controller 60 may calculate the respective further steering commands $1000_i$ on the basis of the respective further local lane data $700_i$, particularly on the basis of the respective further left sideline coefficients $710_i$ and the respective further right sideline coefficients $720_i$, as depicted in FIG. 12. The respective further local lane data $700_i$ may include the respective further left sideline coefficients $710_i$ and the respective further right sideline coefficients $720_i$, as shown in FIG. 12.

Figure 13:
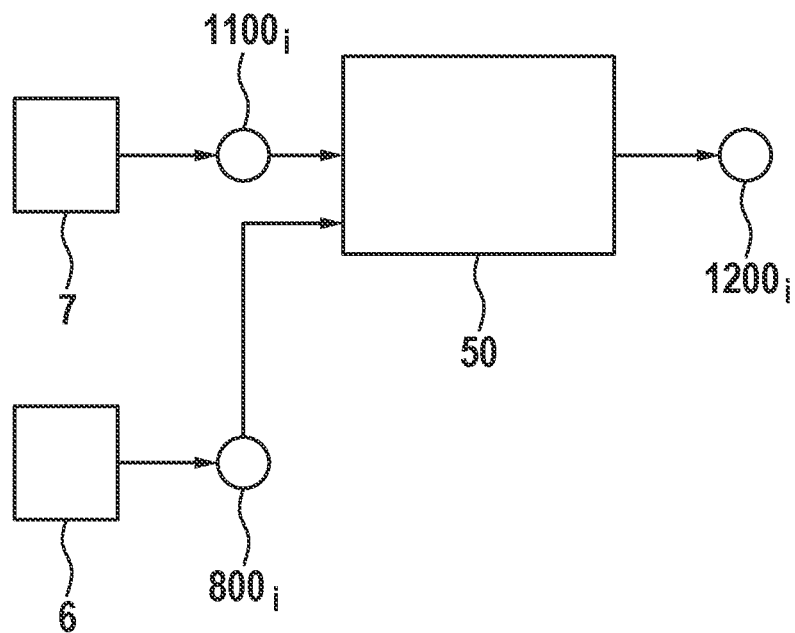
FIG. 13 is a block diagram illustrating a generation of respective second further local lane data on the basis of the respective further image shown in FIG. 10 and the respective further GNSS data shown in FIG. 11.

According to an advantageous embodiment, the driver-assistance system 1 may be configured to calculate respective second further local lane data $1200_i$ dependent on a respective further image $1100_i$ of at least the respective segment $5_i$, as shown in FIG. 13. The respective further image $1100_i$, as shown in FIG. 10, may be generated by the camera 7 when the vehicle 2 drives along the respective segment $5_i$ for the respective repeated time during the respective further time interval. FIG. 8 depicts a first further image $1100_1$ produced by the camera 7 during a first further time interval of the further time intervals in which the vehicle 2 drives along the first segment $5_1$. FIG. 9 depicts a second further image $1100_2$ produced by the camera 7 during a second further time interval of the further time intervals in which the vehicle 2 drives along the second segment $5_2$.

The respective second further local lane data $1200_i$ may specify the respective course of the lane 3 on the respective segment $5_i$, and particularly on the respective subsequent segments, relative to the vehicle 2 during the respective further time interval. The local data module 50 may generate the respective second further local lane data $1200_i$ dependent on the respective further image $1100_i$ in a similar manner as the local data module 50 may calculate the local lane data $200_i$ dependent on the respective image $100_i$ as described above. In one example, the local data module 50 may calculate the respective second further local lane data $1200_i$ dependent on the respective further GNSS data $800_i$, as depicted in FIG. 13.

For example, the sideline detection module 51 may detect the left sideline 111 and the right sideline 112 dependent on respective further pixel data of the respective further image $1100_i$. In addition, the local data module 50 may capture a respective position of the left sideline 111 and the right sideline 112 relative to the vehicle 2 dependent on the respective further pixel data of the respective further image $1100_i$.

According to one example, the control unit 8, and/or components thereof such as the local data module 50, may generate a respective second further mathematical function for describing a respective course of the left sideline 111 of the lane 3 on the respective segment $5_i$ and the respective subsequent segments, in the following also referred to as respective second further left sideline function, within the local coordinate system 30 dependent on the respective further pixel data of the respective further image $1100_i$.

Analogously to the respective second further left sideline function, the control unit 8, and/or components thereof such as the local data module 50, may generate a respective second further right sideline function for describing a respective course of the respective right sideline 112 of the lane 3 on the respective segment $5_i$ and the respective subsequent segments within the local coordinate system 30 dependent on the respective further pixel data of the respective further image $1100_i$. The respective second further right sideline function may differ from the respective further right sideline function; and the respective second further left sideline function may differ from the respective further left sideline function because the respective image $100_i$ is different to the respective further image $1100_i$.

The respective second further left sideline function and the respective second further right sideline function may be each configured in the form of a respective second further polynomial and may be specified by respective second further coefficients. Those second further coefficients that specify the respective second further left sideline function may be referred to as respective second further left sideline coefficients $1210_i$ in the following. Those second further coefficients that specify the respective second further right sideline function may be referred to as respective second further right sideline coefficients $1220_i$ in the following.

The respective second further left sideline function and the respective second further right sideline function may each be configured in the form of a respective second further 4-degree polynomial. In this case, the respective second further 4-degree polynomial may be defined by a respective second further set of four coefficients.

Figure 14:
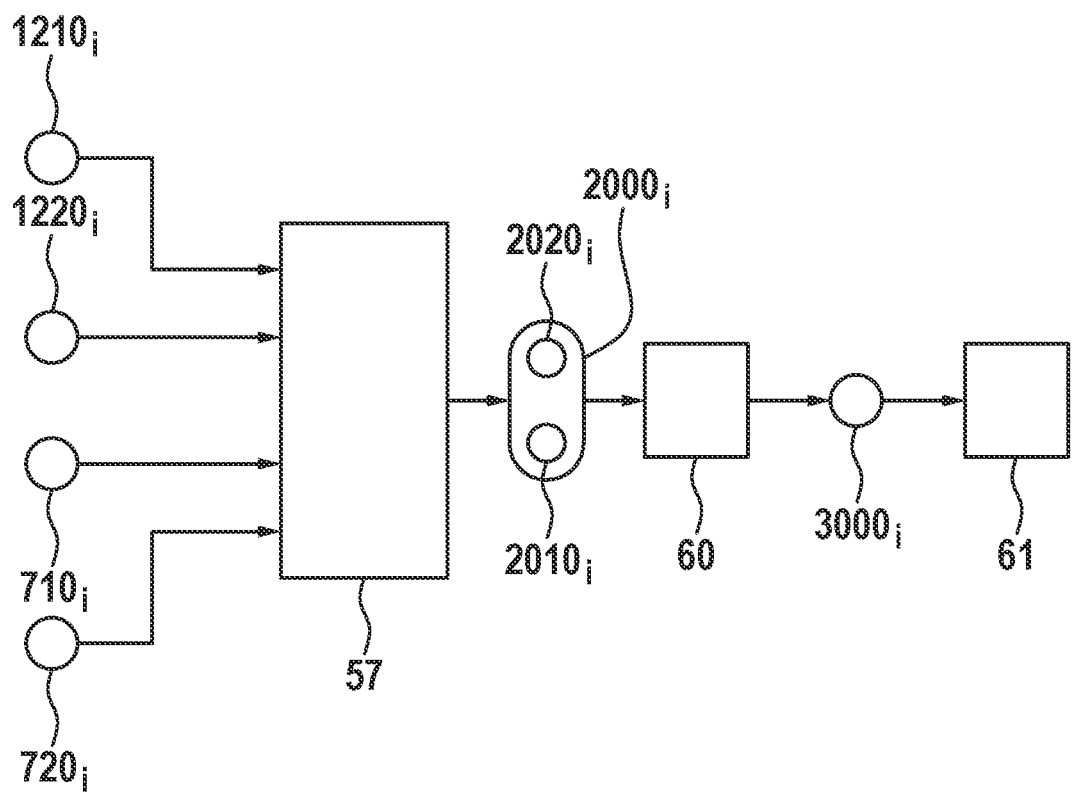
FIG. 14 is a block diagram illustrating a generation of respective fused local lane data on the basis of the respective second further local lane data shown in FIG. 13 and the respective further local lane data shown in FIG. 11.

In one example, the control unit 8 may include a fusion module 57, as depicted in FIG. 14. The fusion module 57 may be configured to calculate respective fused right sideline coefficients $2020_i$ dependent on the respective second further right sideline coefficients $1220_i$ and the respective further right sideline coefficients $720_i$. As such, the fusion module 57 may include one or more processors, memory devices with logic modules that contain stored logic that is executed by the one or more processors, data storage devices, and the like, to perform the operations disclosed herein.

Analogously, the fusion module 57 may be configured to calculate respective fused left sideline coefficients $2010_i$ dependent on the respective second further left sideline coefficients $1210_i$ and the respective further left sideline coefficients $710_i$. The respective fused right sideline coefficients $2020_i$ and the respective fused left sideline coefficients $2010_i$ may each describe a respective third further mathematical function for describing the respective course of the respective right sideline 112 of the lane 3 on the respective segment $5_i$, and on the respective subsequent segments.

In case the respective second further right sideline coefficients $1220_i$ and the respective further right sideline coefficients $720_i$ include the respective set of four coefficients, as mentioned above, the respective fused right sideline coefficients $2020_i$ may also include a respective set of four coefficients. The same may hold for the respective fused left sideline coefficients $2010_i$.

In one example, the fusion module 57 may calculate the respective fused right sideline coefficients $2020_i$ each in the form of a respective weighted sum of one of the respective second further right sideline coefficients $1220_i$ and a corresponding one of the respective further right sideline coefficients $720_i$. To realize this, the fusion module 57 may weight the respective further right sideline coefficients $720_i$ with respect to the respective second further right sideline coefficients $1220_i$ dependent on a respective confidence score of the respective second further right sideline coefficients $1220_i$.

The respective confidence score of the respective second further right sideline coefficients $1220_i$ may be calculated dependent on a respective quality of the respective further image $1100_i$. The higher the respective confidence score of the respective second further right sideline coefficients $1220_i$, the less the respective further right sideline coefficients $720_i$ with respect to the respective second further right sideline coefficients $1220_i$ may be weighted, in one example. The respective fused left sideline coefficients $2010_i$ may be each determined as a respective weighted sum analogously.

Alternatively, or in addition, the fusion module 57 may weight the respective further right sideline coefficients $720_i$ with respect to the respective second further right sideline coefficients $1220_i$ dependent on a respective confidence score of the respective further right sideline coefficients $720_i$. The respective confidence score of the respective further right sideline coefficients $720_i$ may be determined dependent on an accuracy of the respective further GNSS data $800_i$ of the vehicle 2. A lower accuracy of the respective further GNSS data $800_i$ may result in weighting the respective further right sideline coefficients $720_i$ less with respect to the respective second further right sideline coefficients $1220_i$. The respective further left sideline coefficients $710_i$ may be weighted with respect to the respective second further left sideline coefficients $1210_i$ in a similar manner dependent on a respective confidence score of the respective further left sideline coefficients $710_i$.

The lateral controller 60 may control the steering system 61 of the vehicle 2 dependent on the respective fused right sideline coefficients $2020_i$ and the respective fused left sideline coefficients $2010_i$ for keeping the vehicle 2 in the lane 3 when driving on the respective segment $5_i$ the respective repeated time, as depicted in FIG. 14. To achieve this, the lateral controller 60 may send respective second further steering commands $3000_i$ instead of the respective further steering commands $1000_i$ to the steering system 61 within the respective further time interval. The lateral controller 60 may calculate the respective second further steering commands $3000_i$ on the basis of the respective fused right sideline coefficients $2020_i$ and the respective fused left sideline coefficients $2010_i$.

According to one embodiment, the driver-assistance system 1 may be configured to perform a prediction of respective subsequent global lane data specifying the respective course of the lane 3 on a respective subsequent segment $5_{i+1}$ in global coordinates dependent on the respective global lane data $300_i$. The respective subsequent segment $5_{i+1}$ follows the respective segment $5_i$ in the direction of travel of the vehicle 2, as shown in FIG. 15.

Figure 15:
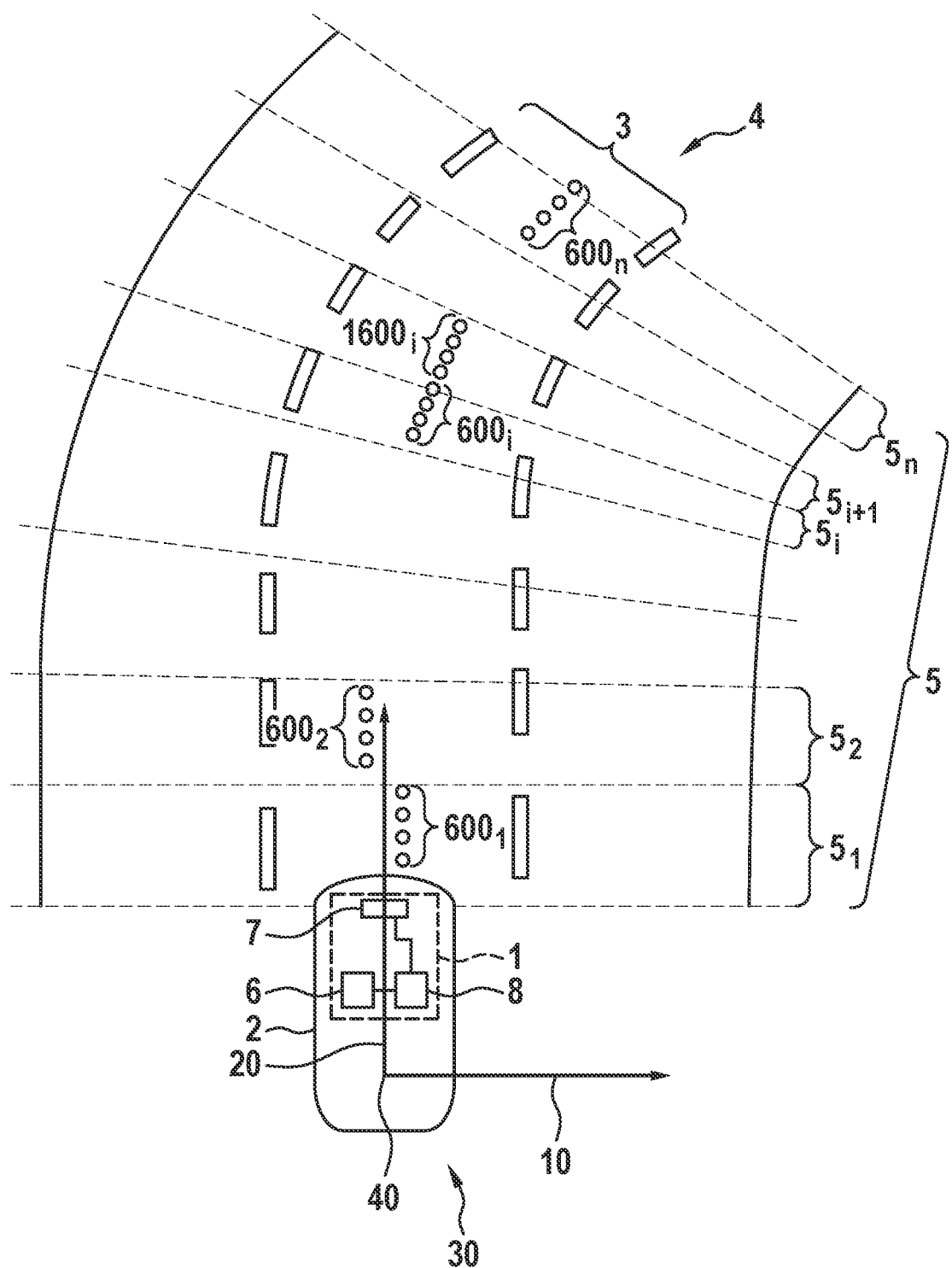
FIG. 15 illustrates respective predicted subsequent global lane data generated by the control unit shown in FIG. 1 when the vehicle drives on the respective segment of the road shown in FIG. 7 for the respective repeated time.

In one example the respective predicted subsequent global lane data may include a respective predicted subsequent set of GNSS points $1600_i$ as depicted in FIG. 15. According to one example, the control unit 8 may extrapolate the course of the respective set of GNSS points $600_i$, which indicate the respective course of the lane 3 on the respective segment $5_i$ as mentioned above, in order to calculate the respective subsequent set of GNSS points $1600_i$.

The driver-assistance system 1 may be configured to calculate respective subsequent local lane data on the basis of the respective predicted subsequent global lane data and on the basis of respective subsequent further GNSS data of the vehicle 2. The respective subsequent further GNSS data may be generated by the GNSS receiver 6 when driving on the respective subsequent segment $5_{i+1}$ for a respective repeated time. Furthermore, the driver-assistance system 1 may be configured to steer the vehicle 2 dependent on the respective subsequent local lane data such that the vehicle 2 stays in the lane 3 when driving on the respective subsequent segment $5_{i+1}$ the respective repeated time. The respective subsequent local lane data may specify the respective course of the lane 3, such as the respective course of the left sideline 111 and the right sideline 112, on the respective subsequent segment $5_{i+1}$ relative to the vehicle 2.

The control unit 8 may process and use the respective predicted subsequent global lane data in order to calculate respective subsequent local lane data in a similar manner as the control unit 8 processes the global lane data $300_i$ for calculating the respective further local lane data $700_i$ as depicted in FIG. 11 and described above. However, instead of processing the global lane data $300_i$ and the respective further GNSS data $800_i$, the control unit 8 may use the respective predicted subsequent global lane data and the respective subsequent further GNSS data respectively.

Determining the respective predicted subsequent global lane data may have the following advantages. On the one hand, the lateral controller 60 may perform a precontrolling of the steering system 61 on the basis of the respective subsequent local lane data. This may enhance a stability of a control loop for controlling the steering system 61 by the lateral controller 60. On the other hand, the respective predicted subsequent global lane data may serve as substitute data in case a respective next set of global lane data is erroneous or just not available. The respective next set of global lane data may include a respective next set of GNSS points $600_{i+1}$ illustrated in FIG. 1 and may be gained analogously to the global lane data $300_i$. In case the respective next set of global lane data is available, the respective next set of global lane data may be used to correct the respective predicted subsequent global lane data.

The control unit 8 may use a Kalman-Filter for determining the respective predicted subsequent global lane data and for correcting the respective predicted subsequent global lane data on the basis of the respective next set of global lane data. In this case, the driver-assistance system 1 may be configured to perform the prediction of respective subsequent global lane data by the Kalman-Filter. A correction of the respective predicted subsequent global lane data may be performed dependent on respective measurement data. The respective measurement data may include a next image generated by the camera 7 when the vehicle 2 drives on the subsequent segment $5_{i+1}$. Using the Kalman-Filter may enhance an accuracy of the prediction of the subsequent global lane data.

Figure 16:
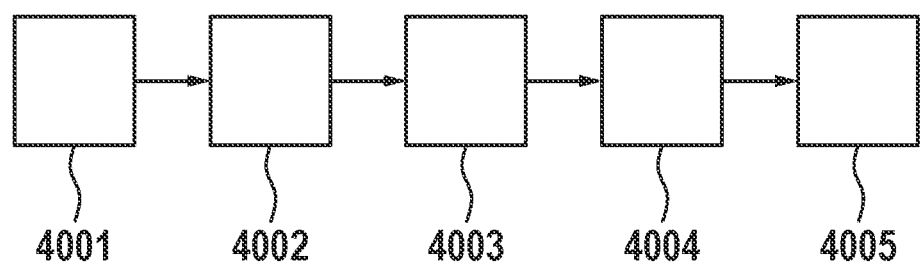
FIG. 16 depicts steps of a method for keeping the vehicle shown in FIG. 1 in the lane when driving along the respective segments of the road shown in FIG. 1.

FIG. 16 illustrates steps of a method for keeping the vehicle 2 in the lane 3 of the road 4 when driving along the segments 5 of the road 4 by the driver-assistance system 1. The method may include the following steps. In a first step 4001, the respective image $100_i$ of at least the respective segment $5_i$ may be generated by the camera 7. To realize this, the camera 7 may be focused towards the respective segment $5_i$, and may be focused towards the respective subsequent segments. In a second step 4002, the respective local lane data $200_i$ may be calculated dependent on the respective image $100_i$, for example as depicted in FIG. 5. The respective local lane data $200_i$ may specify the respective course of the lane 3 on the respective segment $5_i$, and particularly on the respective subsequent segments, relative to the vehicle 2.

In a third step 4003, the vehicle 2 may be steered dependent on the respective local lane data $200_i$ by the control unit 8 such that the vehicle 2 stays in the lane 3 when driving on the respective segment $5_i$, for example as depicted in FIG. 6. In a fourth step 4004, the respective local lane data $200_i$ may be converted into the respective global lane data $300_i$ dependent on the respective GNSS data $400_i$ of the vehicle 2 generated by the GNSS receiver 6 when driving on the respective segment $5_i$. Such a conversion of the respective local lane data $200_i$ is described above. In a fifth step 4005, the respective global lane data $300_i$ may be saved, for example on the memory device 54, the external server 55 and/or on a further memory device of the further vehicle 56. The respective global lane data $300_i$ may specify the respective course of the lane 3 on the respective segment $5_i$ in global coordinates as described above.

Figure 17:
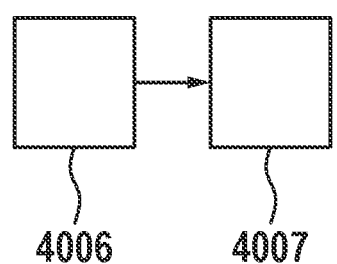
FIG. 17 indicates further steps of the method shown in FIG. 16.

According to one example, the method may include further steps shown in FIG. 17. In a sixth step 4006, the respective further local lane data $700_i$ may be calculated on the basis of the respective global lane data $300_i$ and dependent on the respective further GNSS data $800_i$ of the vehicle 2. The respective further GNSS data $800_i$ may be generated by the GNSS receiver 6 when driving on the respective segment $5_i$ for the respective repeated time. In a seventh step 4007, the vehicle 2 may be steered dependent on the respective further local lane data $700_i$ such that the vehicle 2 stays in the lane 3 when driving on the respective segment $5_i$ the respective repeated time.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A driver-assistance system for keeping a vehicle in a lane of a road when driving along segments of the road, the driver-assistance system comprising:
   a GNSS receiver;
   a camera; and
   a control unit,
   wherein:
   the driver-assistance system is configured to calculate respective local lane data dependent on a respective image of at least the respective segment generated by the camera,
   the respective local lane data specifies a respective course of the lane on the respective segment relative to the vehicle,
   the control unit is configured to steer the vehicle dependent on the respective local lane data such that the vehicle stays in the lane when driving on the respective segment,
   the driver-assistance system is configured to convert the respective local lane data into respective global lane data dependent on respective GNSS data of the vehicle generated by the GNSS receiver when driving on the respective segment and to save the respective global lane data, and
   the respective global lane data specifies the respective course of the lane on the respective segment in global coordinates.

2. The driver-assistance system according to claim 1, wherein:
   the driver-assistance system is configured to calculate respective further local lane data on the basis of the respective global lane data and on the basis of respective further GNSS data of the vehicle generated by the GNSS receiver when driving on the respective segment for a respective repeated time and to steer the vehicle dependent on the respective further local lane data such that the vehicle stays in the lane when driving on the respective segment the respective repeated time, and
   the respective further local lane data specifies the respective course of the lane on the respective segment relative to the vehicle.

3. The driver-assistance system according to claim 2, wherein:
   the driver-assistance system is configured to calculate respective second further local lane data dependent on a respective further image of at least the respective segment generated by the camera when driving on the respective segment for the respective repeated time,
   the respective second further local lane data specifies the respective course of the lane on the respective segment relative to the vehicle, and
   the driver-assistance system is configured to steer the vehicle dependent on the respective further local lane data and dependent on the respective second further local lane data such that the vehicle stays in the lane when driving on the respective segment the respective repeated time.

4. The driver-assistance system according to claim 2, wherein:
- the driver-assistance system is configured to perform a prediction of respective subsequent global lane data specifying the respective course of the lane on a respective subsequent segment in global coordinates dependent on the respective global lane data,
- the respective subsequent segment follows the respective segment in a direction of travel of the vehicle,
- the driver-assistance system is configured to calculate respective subsequent local lane data on the basis of the respective predicted subsequent global lane data and on the basis of respective subsequent further GNSS data of the vehicle generated by the GNSS receiver when driving on the respective subsequent segment for a respective repeated time and to steer the vehicle dependent on the respective subsequent local lane data such that the vehicle stays in the lane when driving on the respective subsequent segment the respective repeated time, and
- the respective subsequent local lane data specifies the respective course of the lane on the respective subsequent segment relative to the vehicle.

5. The driver-assistance system according to claim 4, wherein the driver-assistance system is configured to perform the prediction of respective subsequent global lane data using a Kalman-Filter.

6. The driver-assistance system according to claim 1, wherein the local lane data specifies a respective course of at least one sideline of the lane on the respective segment.

7. The driver-assistance system according to claim 6, wherein the local lane data comprises a first value indicating a distance between the sideline and the vehicle, a second value indicating a direction of the sideline relative to a longitudinal axis of the vehicle, a third value indicating a curvature of the sideline and a fourth value indicating a derivation of the curvature with respect to a direction that is parallel to the longitudinal axis of the vehicle.

8. The driver-assistance system according to claim 1, wherein driver-assistance system is further configured to:
- save the respective global lane data on an external computing device for providing the respective global lane data to a control unit of a further vehicle for steering the further vehicle dependent on the respective global lane data and respective further GNSS data of the further vehicle generated by a GNSS receiver of the further vehicle when driving on the respective segment such that the further vehicle stays in the lane when driving on the respective segment.

9. A method for keeping a vehicle in a lane of a road when driving along segments of the road by a driver-assistance system, the driver-assistance system having a GNSS receiver, a camera and a control unit, the method comprising the following steps:
- generating a respective image of at least the respective segment by the camera;
- calculating respective local lane data dependent on the respective image, wherein the respective local lane data specifies a respective course of the lane on the respective segment relative to the vehicle;
- steering the vehicle dependent on the respective local lane data by the control unit such that the vehicle stays in the lane when driving on the respective segment;
- converting the respective local lane data into respective global lane data dependent on respective GNSS data of the vehicle generated by the GNSS receiver when driving on the respective segment; and
- saving the respective global lane data, wherein the respective global lane data specifies the respective course of the lane on the respective segment in global coordinates.

10. The method according to claim 9 comprising the following further steps:
- calculating respective further local lane data on the basis of the respective global lane data and dependent on respective further GNSS data of the vehicle generated by the GNSS receiver when driving on the respective segment for a respective repeated time, wherein the respective further local lane data specifies the respective course of the lane on the respective segment relative to the vehicle; and
- steering the vehicle dependent on the respective further local lane data such that the vehicle stays in the lane when driving on the respective segment the respective repeated time.

* * * * *